UNITED STATES PATENT OFFICE.

HANUEMON YENJO, OF NIHONBASHI-KU, TOKYO, JAPAN.

PROCESS OF PRODUCING DIGESTIVE FERMENT.

1,065,575.     Specification of Letters Patent.     Patented June 24, 1913.

No Drawing.     Application filed August 19, 1911.   Serial No. 644,952.

*To all whom it may concern:*

Be it known that I, HANUEMON YENJO, residing at No. 7 Honcho Sanchome, Nihonbashi-Ku, Tokyo, Japan, a subject of the Emperor of Japan, a merchant druggist and an inventor, am in possession of an Invention for the Process of Producing Digestive Ferment; and I, the said HANUEMON YENJO, do hereby declare the nature of my said invention and in what manner the same is to be performed to be particularly described and ascertained in and by the following statement thereof—that is to say:

My invention relates to the process of producing digestive ferment in which boiling powdered bean mixed with a moderate quantity of sodic phosphate, potassium nitrate and magnesium sulfate under pressure liquefy, the liquid thus obtained being used for moistening wheat or rice bran and the bran being then steamed. When the mass is cooled, the combined fungi of orange *Monilia* and *Aspergillus orygee* being mixed with it, we shall have "koji" of the above two molds produced. From the "koji" thus obtained enzym is to be extracted for the preparation of the digestive ferment.

The object of my invention is to produce a digestive ferment possessing both the properties of dissolving proteids and of saccharizing amylaceous bodies.

*Preparation of the "koji" fungus.*—In this process, wheat or rice bran is to be moistened to a proper degree with the said liquid (obtained by boiling sodic phosphate, potassium nitrate, and magnesium sulfate together with powdered bean rich in vegetable proteids, under pressure for two hours), and then steamed, so as to convert starch completely into dextrin, and then cooled; its constituents differ greatly from those of the bran moistened with ordinary water and steamed. The fungus produced by the culture of four parts of orange *Monilia* and six parts of *Aspergillus orygee* on the steamed wheat or rice bran, naturally sustains a great change in its nature on account of its being grown in the medium containing an ample quantity of soluble proteids and mineral nutrients in the stages of its development, and it is much more effective in dissolving gelatin and proteid matters and in saccharizing starch, than the fungus cultivated in an ordinary manner. In this process, by using together the orange *Monilia* and *Aspergillus orygee*, which had never been investigated technically, the produced "koji" fungus possesses both the properties of dissolving proteid matters and saccharizing starch. Orange *Monilia* had never been treated technically, but it belongs to *Monilia* group and as it possesses a fine orange color, I called it orange *Monilia*. It has the faculty of dissolving proteids and can easily be cultivated on gelatin or agar-agar medium, and then it dissolves them more quickly than any other fungus. The condition of its development is just the same as *Aspergillus orygee*, while it secretes a powerful enzym during its development. My experiments for many years had proved that this enzym is more powerful in dissolving starch, fibrin and proteids, and it saponifies fatty matters more satisfactorily than those secreted by other fungi.

*Preparation of the "koji".*—The bran of the farinaceous substances is mixed with powdered bean and is properly moistened with moderate quantity of the culture liquid (the liquid produced by boiling powdered bean, sodic phosphate, potassium nitrate and magnesium sulfate with water under pressure and steamed, until the starch is completely dextrinized, and at the same time to pasteurize all other injurious fungi. When cooled to about 30 C., the mass is well mixed with the "fungus" produced in the previous stage and placed in many koji trays. Keeping the temperature of the cellar at 25 C., after four days the fungus will be perfectly developed. The culture liquid being rich in phosphate, potassium nitrate, and magnesium salt, as well as nitrogeneous constituents, it affords a suitable medium for the development of the fungus. Now in course of its development, the fungus supplied with the said culture liquid, it produces an exceedingly powerful enzym with the said culture liquid. This enzym possesses the faculty of decomposing all proteids to the soluble stage of lower formations, viz: Albumose, peptose, amido acid and other amido groups, and it is most effective in converting starch into sugar, saponifying fatty matters and in converting fibrin into a soluble state. These properties are accounted in my process as the most prominent feature in the preparation of the "koji" fungus of my invention and I may state that it is due to the soluble nutrients of the culture liquid which is well adapted for the active growth and development of the fungus. Now if we add ammonia to the filtered clear culture liquid, a white precipitate will be produced, and by well washing the precipitate with dilute ammonia water, filtering, pressing and then drying it, we obtain a white powder, which has a composition of some organic magnesium phosphate compound. The reports of the medical experiments with regard to the white powder proved that it is well adapted for curing nervous prostration, cardiac weakness, constipation and beri-beri, and gives wonderful benefit by employing it for the convalescent state after a serious disease, and its constant use is designed for the promotion of good health.

*Process of infusion "koji" ferment.*—When the "koji" previously mentioned, is evenly sprinkled over with liquid such as dilute alcohol of twenty per cent. or a dilute solution of glycerin by an automatic spray machine and left for twenty or twenty three hours at 20–30 C., all the soluble ferments, soluble salts and sugars are extracted in the liquid. Now taking the new "koji" and repeating the infusion as before with liquid produced by pressing the previous infusion mass a thicker liquid (properly 8 degrees Baumé) will be obtained. To this liquid, the powdered germinated bean is added, and the mixture is stirred by an air injector for ten hours. It is now filtered and alcohol is added to the liquid to the strength of thirty five to forty per cent. (35%–40%), and left ten hours during which, all the phosphate compounds with other impurities are completely precipitated. When the liquid is transparent, the upper portion is taken off by means of a siphon, and alcohol of ninety per cent. strength is added to that liquid, and a precipitate is immediately produced. This precipitate is repeatedly washed with alcohol and then ether, filtered and then pressed. The pressed mass is to be dried over strong sulfuric acid, or if the same quantity of maltose is added to the said transparent liquid we shall have an efficient digestive ferment in the syrup state.

The employment of the powdered germinated bean for the purpose of increasing the strength of the ferment for dissolving proteid and gelatinous matters, is the most prominent feature in our infusion process. It is well known that the employment of malt powder in the same way, increases the saccharizing strength of the ferment, but the employment of the powdered germinated bean in infusion process, for increasing faculty of dissolving proteid and gelatinous matters, which characterizes the ferment, is the novel feature of my invention. In short, this process of producing the digestive ferment by the proper application of the novel feature previously mentioned, is the invention which is important in its nature and has no precedent. Some alteration can be made in this process without materially affecting the principles of my invention.

Having now particularly described and ascertained the nature of my said invention, and in what manner the same is to be performed, I declare that what I claim is:—

A process for producing digestive ferment which consists in boiling powdered bean, sodium phosphate, potassium nitrate, and magnesium sulfate with water under pressure, moistening wheat bran with the liquid thus produced, steaming the product, mixing the combined funguses of orange *Monilia* and *Aspergillus orygee* produced in a special process with bran of farinaceous substances which has been previously mixed with powdered bean and moistened with liquid produced as above, treating the "koji" obtained thereby with dilute alcohol, pressing the product, adding powdered germinated bean to the expressed liquid, adding alcohol of thirty five per cent. to the filtrate whereby all the phosphates and other impurities are precipitated, treating the clear liquid with strong alcohol, washing the precipitate obtained with alcohol and ether, and then drying the same.

In testimony whereof I have signed my name to this specification in the presence of two subscribing witnesses.

HANUEMON YENJO.

Witnesses:
  K. NISHIMOTO,
  GENJI KURIBARA.